May 3, 1949.　　　　E. B. HUDSON　　　　2,468,931
CAR WHEEL CONSTRUCTION FOR RESISTING THE
TRANSMISSION OF VIBRATIONS
Filed Aug. 6, 1945　　　　　　　　　　　　2 Sheets-Sheet 1
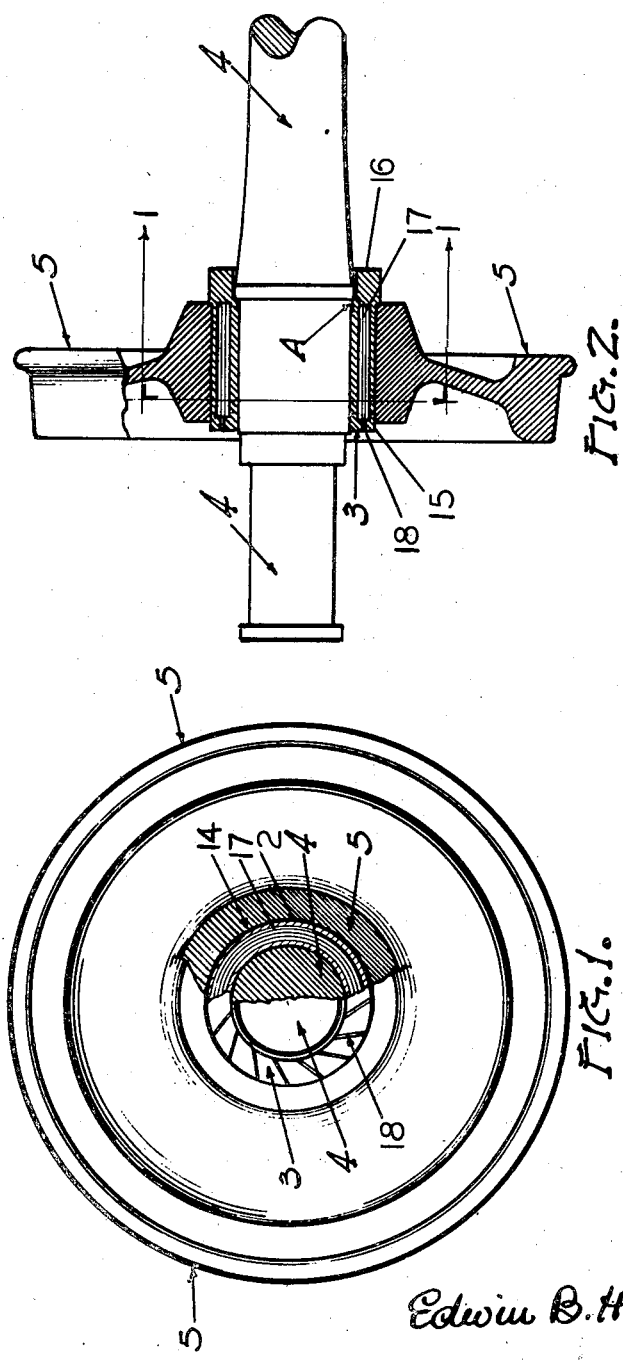

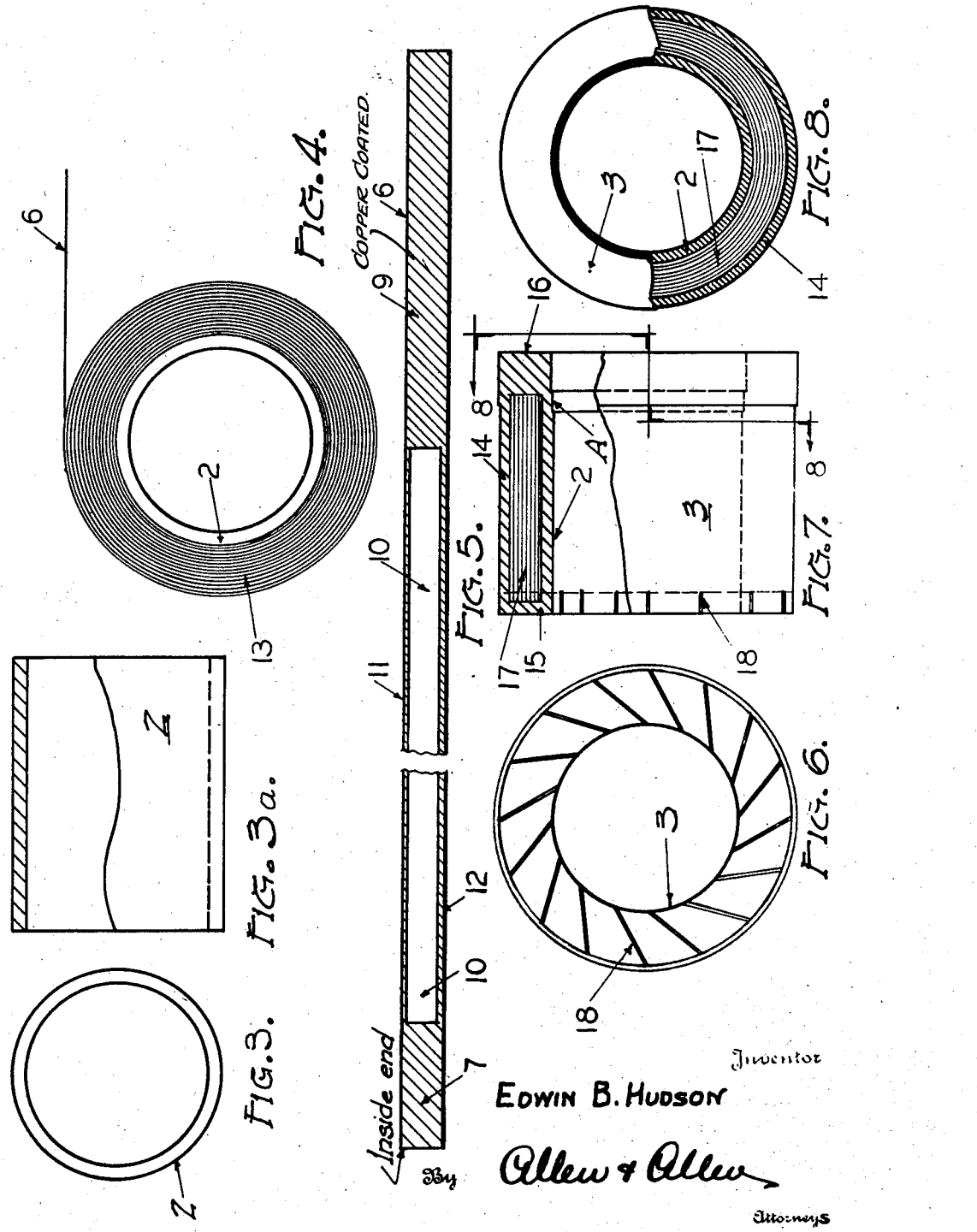

Patented May 3, 1949

2,468,931

UNITED STATES PATENT OFFICE 2,468,931

CAR WHEEL CONSTRUCTION FOR RESISTING THE TRANSMISSION OF VIBRATIONS

Edwin B. Hudson, Middletown, Ohio, assignor to Armco Steel Corporation, a corporation of Ohio Application August 6, 1945, Serial No. 609,094

16 Claims. (Cl. 295—14)

My invention relates to improvements in car wheels for railroads, street railways and the like.

In the common construction a cast or forged steel car wheel is mounted directly upon a steel axle with a press fit. It has hitherto been suggested that resilient material such as rubber, gutta percha, rubberized fabrics or the like be inserted between the car wheel and the axle. Other suggestions have involved the use of rubber discs or other members loaded in shear, and interposed between the rim and hub portions of car wheels.

The principal object of these suggestions was the provision of a structure by means of which vibration and shock caused by the wheels running over rail joints, frogs and crossings, would be prevented in some measure at least from reaching the trucks and car bodies. Noise and discomfort on passenger trains as well as damage to the contents of freight cars could be reduced by such means.

In commercial practice, however, difficulties developed. Where rubber or other resilient material was interposed between the car wheel and the axle or between the hub and rim of a wheel, eccentricity tended to develop and sometimes reached large dimensions, up to ¼ to ⅜ of an inch, rendering the use of the wheels impracticable. Certain designs also employed fastenings such as screws and bolts; and these presented a hazard on high speed trains.

In a copending application, Serial No. 574,890 filed January 27, 1945, and entitled Resilient car wheel, I have disclosed a structure in which resilient material, such, for example, as the fabric of Patent 2,009,059, is preloaded and employed in connection with car wheels in such fashion as to obviate both the development of eccentricity and the use of fastening devices.

It is an object of the present invention, however, to provide an all-metal structure which does away with resilient non-metallic means while greatly reducing the transmission of vibrations.

It is an object of my invention to provide an all-metal structure having pronounced damping characteristics, but capable of engagement with both the car wheel and the axle by press fits. Thus the changing of wheels is facilitated and my resilient structures may be used with successive wheels which are changed as they require regrinding or replacement. My resilient means are incorporated in a hub-like structure which may remain as an assembled part either of the car axle or of the wheel, as desired.

Another object of the invention is the provision of a damping structure which acts in valuable measure to minimize axle fatigue and hence inhibit axle failure, and also to protect the wheels themselves by minimizing wear, shelling, and cracking.

Another object of my invention is the provision of an all-metal resilient bushing which has been properly preloaded and which retains its preloaded characteristics, as will hereinafter be made clear.

These and other objects of my invention which will be set forth herein or will be apparent to one skilled in the art upon reading these specifications, I accomplish by that construction and arrangement of parts of which I shall now describe an exemplary embodiment. Reference is made to the drawings wherein:

Figure 1 is a front elevational view of a car wheel including the axle and incorporating my resilient member, certain parts being shown in section taken along the line 1—1 of Figure 2.

Figure 2 is an edge elevational view of my car wheel, including the axle and incorporating my structure, certain parts being shown in section.

Figures 3 and 3a are respectively end and side elevational views of a tubular member forming part of my damping member or bushing.

Figure 4 is illustrative of the method of wrapping strip on the said tubular member.

Figure 5 is a plan view of a strip.

Figure 6 is an end view of the outside end of my resilient bushing after machining.

Figure 7 is a side elevation of my bushing, certain parts being shown in section.

Figure 8 is an end view of my resilient bushing, certain parts being shown in section, the section being taken along the line 8—8 of Figure 7.

In the practice of my invention I form a vibration damping bushing having a laminated construction provided by winding a relatively thin gauge metal strip upon a suitable central support. The convolutions of the metal strip are held together in an integral metallic structure at the ends of the wound element and at the inner and outer cylindrical surfaces thereof; but centrally of the bushing the laminae are free of attachment to each other. This structure may be machined to reduce it to accurate dimensions. Also for a reason hereinafter set forth, non-radial cuts are made in at least one end of the structure through the integrally joined portion. In this way, I provide a bushing which may be given a press fit on an axle and a press fit within the hub of a wheel. Preloading is attained by winding the strip on the support under suitable tension and also by the press fits aforesaid. The construction of the bushing is such that the loads are sustained by the laminated central, rather than the integral or monolithic end portions, of the bushing.

I provide as a support a tubular member 2 which is cylindrical in form and upon which the strip 6 is wound. This tubular member may be of steel or other suitably strong metal. The strip is preferably a cold rolled strip of steel or other suitably strong metal. It may vary as to gauge but I prefer to employ gauges between 20 and 24. A suitable material is ordinary low carbon or "mild steel" cold rolled strip.

The strip 6 is to be wound upon the support 2, and since portions of the convolutions are to be fastened together into a monolithic metal structure while other portions are to be left free, I have found that a convenient way of accomplishing the ends of this invention is to prepare the strip in part of its area for a hydrogen brazing operation, while treating other portions of its area so that brazing will not occur. The portions of the strip which are to be united are coated with copper to facilitate brazing while the portions which are to remain as separate laminae are caused to remain uncoated. The copper coating may be applied to the suitably cleaned strip surface electrolytically. That area which is to be devoid of the copper coating is shielded from the electrolytic action as by coating it with a removable impervious insulating substance.

In Figure 5 I have diagrammatically illustrated the steel strip 6, shaded areas of which indicate a copper coating. The strip is coated as at 7 throughout the surface area of an initial portion or inside end of sufficient length to permit the formation of one or more wraps upon the support 2 which will be brazed together and to the support. At the opposite end, as at 9, the strip will be coated throughout its surface area for a sufficient longitudinal distance to provide a plurality of wraps which will be brazed together, giving a monolithic outer surface or skin to my bushing. The depth of this may vary; but it should be thick enough to permit necessary machining of the bushing to attain a desired outside diameter as hereinafter set forth.

The intermediate and by far the longer portion of the strip is devoid of coating, as indicated at 10, except at the edges thereof. For reasons hereinafter set forth, I prefer to make the width of one of these edge portions 11 substantially narrower than the width of the other edge portion 12. The copper coating along these edges permits edge portions of the convolutions to become brazed together while mid-portions thereof remain free.

The uncoated portion 10 of the strip is preferably treated with talc, soapstone or other suitable material which will prevent brazing or welding; and it is also desirable that the strip 6 have initially roughened surfaces such as those made by shot blasted mill rolls, in order to prevent undesired sticking under temperatures encountered in the brazing operation.

The inside end of the strip is spot welded or otherwise attached to the support 2 which in turn is mounted on a power driven mandrel. The strip is retarded while the mandrel is driven so as to exert a relatively high tension on the strip, the entire length of which is wound up upon the support, as diagrammatically indicated in Figure 4, to form a coil 13. When this is accomplished, the outside end of the strip is spot welded to the last wrap or is otherwise held in place. The tension may be proportioned to the strength of the strip. The greater the tension, the greater the preloading. By way of example, for mild steel strip I may employ a tension of 200 to 500 lbs. per lineal inch of strip width.

I next subject the tension-wound structure to a hydrogen brazing operation in which the copper coated parts become integrally joined. In view of the copper coating, it is only necessary to subject the wound structure to a brazing temperature in a furnace having a suitably controlled atmosphere. The disposition of the copper coating, as described, will result in brazing or union in such fashion as to provide a bushing 3 shown in section in Figures 7 and 8 wherein inside convolutions are integrally joined to the support 2, the outside convolutions form a monolithic structure 14, and all convolutions are joined at the edges as at 15 and 16, while in the whole central portion the intermediate convolutions are free of each other as at 17.

The length of the bushing is preferably such that the load may be applied over the area of that portion of it characterized by free laminae, i. e. the portion 17. In car wheel and axle construction there is plenty of room for the integrally joined edges of the convolutions 16 to extend beyond the hub of the wheel on the inside, as shown in Figure 2.

The support 2 is of sufficient thickness to permit machining for an accurate press fit upon the axle 4, and to permit the bore of my bushing to be relieved at a point A (see Figure 2) at the inner end of the wheel receiving face of the axle, with a radial clearance dimension of .003 to .004 inch to prevent column action of the bushing portion 16. Axial loads are taken by the solid or integral inside end portion 16 of the bushing 3.

Since, by reason of the standard journal box and bearing (not shown), my resilient bushing cannot extend much beyond the outside face of the wheel hub, I prefer to increase the damping action of the monolithic end portion 15 by making saw cuts 18 across it, as shown in Figures 1, 6 and 7. These cuts extend from the outer to the inner diameter of the bushing, and pass through the integrally joined end portions of the laminae and into the area of free laminae. The saw cuts are in non-radial position to prevent column action. Thus, the solid metal between the cuts is free to roll over slightly under load, thus preserving resiliency even though the integrally joined edge portion is located in whole or in part between the hub and axle.

In the assembly of the wheel 5 to the bushing 3 and the axle 4, my bushing is machined so that suitable interference fits are attained to give equal radial fit pressures.

Modifications may be made in my invention without departing from the spirit of it. Having thus described my invention, what I claim as new and desire to secure by Letters Patent, is:

1. A shock absorbing structure comprising a plurality of tensioned metal laminae in the form of a convoluted coil, outer and inner convolutions of said coil being integrally joined together, and all convolutions being integrally joined together at the edges of the coil, the laminae interiorly of the coil being free of such union.

2. A shock absorbing structure comprising a plurality of metal laminae formed from strip wound under tension onto a central hollow support to form a hollow, convoluted coil, an inner convolution being joined to said support, outer convolutions being integrally joined together, and all convolutions being integrally joined together at the edges of the coil, the laminae interiorly of the coil being free of such union.

3. A shock absorbing structure comprising a plurality of metal laminae formed from strip wound under tension onto a central hollow support to form a hollow, convoluted coil, an inner convolution being joined to said support, outer convolutions being integrally joined together, and all convolutions being integrally joined together at the edges of the coil, the laminae interiorly of the coil being free of such union, said coil being provided at one end at least with non-radial cuts passing through the integrally joined edge portions of the convolutions into the unjoined laminae.

4. A shock absorbing structure comprising a plurality of metal laminae formed from strip wound under tension onto a central hollow support to form a hollow, convoluted coil, an inner convolution being joined to said support, outer convolutions being integrally joined together, and all convolutions being integrally joined together at the edges of the coil, the laminae interiorly of the coil being free of such union, said coil being provided at one end at least with non-radial cuts passing through the integrally joined edge portions of the convolutions into the unjoined laminae, said shock absorbing structure having an internal diameter to take a press fit with an axle and an external diameter to take a press fit in the hub of a car wheel.

5. A shock absorbing structure comprising a plurality of metal laminae formed from strip wound under tension onto a centrol hollow support to form a hollow, convoluted coil, an inner convolution being joined to said support, outer convolutions being integrally joined together, and all convolutions being integrally joined together at the edges of the coil, the laminae interiorly of the coil being free of such union, said coil being provided at one end at least with non-radial cuts passing through the integrally joined edge portions of the convolutions into the unjoined laminae, said shock absorbing structure having an internal diameter to take a press fit with an axle and an external diameter to take a press fit in the hub of a car wheel, the internal diameter of the said shock absorbing structure being relieved at the other end inwardly a sufficient distance to exclude from said press fit the integrally joined portion of said laminae at said end.

6. A shock absorbing structure comprising a plurality of metal laminae formed from strip wound under tension onto a central hollow support to form a hollow, convoluted coil, an inner convolution being joined to said support, outer convolutions being integrally joined together, and all convolutions being integrally joined together at the edges of the coil, the laminae interiorly of the coil being free of such union, said coil being provided at one end at least with non-radial cuts passing through the integrally joined edge portions of the convolutions into the unjoined laminae, said shock absorbing structure having an internal diameter to take a press fit with an axle and an external diameter to take a press fit in the hub of a car wheel, the said shock absorber structure being longer than the bore of the said wheel hub and so dimensioned as to extend beyond said hub on both sides, the central unjoined portion of the laminae having a width axially of the coil substantially equal to the depth of the bore of said hub.

7. A shock absorbing structure comprising a plurality of metal laminae formed from strip wound under tension onto a central hollow support to form a hollow, convoluted coil, an inner convolution being joined to said supoprt, outer convolutions being integrally joined together, and all convolutions being integrally joined together at the edges of the coil, the laminae interiorly of the coil being free of such union, said coil being provided at one end at least with non-radial cuts passing through the integrally joined edge portions of the convolutions into the unjoined laminae, said shock absorbing structure having an internal diameter to take a press fit with an axle and an external diameter to take a press fit in the hub of a car wheel, said shock absorbing structure and said axle being provided with abutted shoulders to withstand thrust strains.

8. A shock absorbing structure for interposition between an axle and the hub of a car wheel, said structure comprising a cylindrical central supporting member, a steel strip wound thereon under tension, at least one inner convolution of said strip being integrally joined to said supporting member, outer convolutions of said strip being also integrally joined, edge portions of all convolutions being likewise integrally joined, the laminae interiorly of the coil being free of such union, whereby a structure is produced of annular form and of integral character on all exposed surfaces.

9. A shock absorbing structure for interposition between an axle and the hub of a car wheel, said structure comprising a cylindrical central supporting member, a steel strip wound thereon under tension, at least one inner convolution of said strip being integrally joined to said supporting member, outer convolutions of said strip being also integrally joined, edge portions of all convolutions being likewise integrally joined, the laminae interiorly of the coil being free of such union, whereby a structure is produced of annular form and of integral character on all exposed surfaces, said structure being dimensioned on its inner and outer surfaces to take a press fit with said axle and said car wheel hub.

10. The structure claimed in claim 9 in which one end of the shock absorbing structure is provided with non-radial cuts extending through the integrally joined edge portions of the convolutions.

11. In combination with a car wheel and an axle, an annular shocks absorbing metal unit interpositioned between the car wheel and the axle, said unit comprising a convoluted winding of metal strip in coil form, the said strip being under tension, the said coil having its convolutions integrally joined at inner and outer surfaces and at end edge surfaces, the metal strip in said structure being in a state of tension maintained by the aforesaid integral union, central portions of said convolutions being in the form of non-joined laminae, the dimension of said non-joined laminae axially of the structure being approximately the equivalent of the depth of the wheel portion engaging the structure.

12. In combination with a car wheel and an axle, an annular shock absorbing metal unit interpositioned between the car wheel and the axle, said unit comprising a convoluted winding of metal strip in coil form, the said strip being under tension, the said coil having its convolutions integrally joined at inner and outer surfaces and at end edge surfaces, the metal strip in said structure being in a state of tension maintained by the aforesaid integral union, central portions of said convolutions being in the form of non-joined laminae, the dimension of said non-joined laminae axially of the structure being approximately the equivalent of the depth of the wheel portion engaging the structure, one end at least of said shock absorbing structure having non-radial cuts extending through the integrally joined edge portions of laminae.

13. A process of making a shock absorbing structure which comprises selecting a ferrous metal of a length to produce a convoluted coil of desired diameter, imposing copper selectively on a face of said strip to coat end portions thereof across their width but to coat intermediate portions thereof substantially only along side edges of said strip, attaching said strip to a support, winding said strip on said support under tension, attaching an outer convolution of said strip to maintain said tension, and then subjecting the wound structure to a brazing operation resulting in the integral union of convolutions of said strip to each other in the areas upon which copper has been imposed.

14. A process of making a shock absorbing structure which comprises selecting a ferrous metal of a length to produce a convoluted coil of desired diameter, imposing copper selectively on a face of said strip to coat end portions thereof across their width but to coat intermediate portions thereof substantially only along side edges of said strip, attaching said strip to a support, winding said strip on said support under tension, attaching an outer convolution of said strip to maintain said tension, and then subjecting the wound structure to a brazing operation resulting in the integral union of convolutions of said strip to each other in the areas upon which copper has been imposed, afterward machining the inside surface of said support and the outside surface of said convoluted structure to provide press fits respectively upon an axle and within the hub of a car wheel.

15. A process of making a shock absorbing structure which comprises selecting a ferrous metal of a length to produce a convoluted coil of desired diameter, imposing copper selectively on a face of said strip to coat end portions thereof across their width but to coat intermediate portions thereof substantially only along side edges of said strip, attaching said strip to a support, winding said strip on said support under tension, attaching an outer convolution of said strip to maintain said tension, and then subjecting the wound structure to a brazing operation resulting in the integral union of convolutions of said strip to each other in the areas upon which copper has been imposed, afterward machining the inside surface of said support and the outside surface of said convoluted structure to provide press fits respectively upon an axle and within the hub of a car wheel, and forming cuts of non-radial direction across at least one end portion of said convoluted structure, said cuts extending through integrally joined edge portions of said laminae.

16. The process claimed in claim 13 wherein the central portion of said strip upon which copper has not been imposed is coated with a substance which inhibits brazing.

EDWIN B. HUDSON.

REFERENCES CITED

The following references are of record in the file of this patent:

UNITED STATES PATENTS

| Number | Name | Date |
| --- | --- | --- |
| 40,498 | Patterson | Nov. 3, 1863 |
| 1,954,840 | Young | Apr. 17, 1934 |